United States Patent [19]

Meeus et al.

[11] Patent Number: 4,632,699

[45] Date of Patent: Dec. 30, 1986

[54] PROCESS FOR PREPARING ZINC POWDER FOR ALKALINE BATTERIES

[75] Inventors: Marcel L. Meeus, Lommel; Yvan A. J. Strauven, Neerpelt; Luc A. J. Groothaert, Overpelt, all of Belgium

[73] Assignee: Metallurgie Hoboken-Overpelt, Hoboken, Belgium

[21] Appl. No.: 719,417

[22] Filed: Apr. 3, 1985

[30] Foreign Application Priority Data

Apr. 17, 1984 [LU] Luxembourg .............................. 85322

[51] Int. Cl.$^4$ .......................... C22C 1/04; C22C 18/00
[52] U.S. Cl. .................... 75/0.5 B; 75/0.5 C; 75/251; 420/513; 252/182.1; 429/230
[58] Field of Search ............ 252/182.1; 75/0.5 B, 75/251, 0.5 C; 420/513; 428/570; 429/230

[56] References Cited

U.S. PATENT DOCUMENTS

| | | | |
|---|---|---|---|
| 3,427,204 | 2/1969 | Clune et al. | 252/182.1 |
| 3,764,388 | 10/1973 | Marincic | 420/513 |
| 3,926,672 | 12/1975 | Curelop et al. | 252/182.1 |
| 4,104,188 | 8/1978 | Nicaise | 252/182.1 |
| 4,460,543 | 7/1984 | Glaeser | 420/513 |
| 4,578,109 | 3/1986 | Miyazaki | 420/513 |

FOREIGN PATENT DOCUMENTS

| | | | |
|---|---|---|---|
| 89608 | 9/1983 | European Pat. Off. | 420/513 |
| 3238240 | 4/1984 | Fed. Rep. of Germany | 429/230 |
| 2051132 | 4/1983 | United Kingdom . | |

*Primary Examiner*—Herbert B. Guynn
*Assistant Examiner*—Anne Brookes
*Attorney, Agent, or Firm*—Fred Philpitt

[57] ABSTRACT

Starting from a homogeneous molten bath composed of zinc, mercury and possibly other elements, an alloy powder with substantially homogeneous particles is prepared and that alloy powder is made to react with metallic mercury or with a mercury compound, thereby producing an alloy powder enriched with mercury.

16 Claims, No Drawings

PROCESS FOR PREPARING ZINC POWDER FOR ALKALINE BATTERIES

The present invention relates to a process for preparing zinc base powder containing mercury for alkaline batteries, according to which an alloy powder with substantially homogeneous particles is prepared starting from a homogeneous molten bath composed of zinc, mercury and, possibly, other elements.

Such process is described in the patent application Nos. DE-A-2441356 and EP-A-0089608. According to No. DE-A-2441356 zinc base powder containing mercury for alkaline batteries is prepared by pulverizing in a gaseous current a homogeneous molten bath composed of zinc, mercury and, possibly, other elements. According to No. EP-A-0089608, such powder is prepared by granulating in water a homogeneous molten bath composed of zinc and mercury and by crushing the thus obtained granules. Hence, in both cases an alloy powder is obtained, the particles of which have substantially the same composition as that of the molten bath, and this alloy powder or a sized fraction thereof forms then the end-product of the process. Owing to its mercury content, this alloy powder is very resistant to corrosion in the electrolyte of the alkaline battery, particularly when its mercury content ranges from 5 to 7% in weight, as appears from the paper "Zinc powder for alkaline dry batteries" by M. Meeus, L. Vos and L. Groothaert, published in "Battery Material Symposium", Brussels 1983, Volume 1. It is known that the zinc powder corrosion in an alkaline dry battery entails a prejudicial release of hydrogen. It is also known that the presence of mercury in alkaline batteries gives ecological problems.

The aim of the present invention is to provide a process as defined before, that enables to produce a powder containing less mercury than the powders produced by the abovementioned known processes, but being as resistant to corrosion in alkaline medium as said powders.

According to the invention the alloy powder is made to react with metallic mercury and/or with a mercury compound, thereby producing an alloy powder enriched with mercury. Thus, the alloy powder is subjected to a surface amalgamation.

It should be noted that it is already known to prepare zinc base powder containing mercury for alkaline batteries by subjecting mercury-free zinc powder to a surface amalgamation. The powder obtained by this process requires, however, even more mercury than those obtained by the aforementioned known processes in order to give it sufficient resistance to corrosion in alkaline medium.

In the process of the invention, it is advantageous to operate in such a way that the alloy powder has a mercury content from 0.5 to 4% in weight, preferably from 0.5 to 2%, that the reaction of the alloy powder with the mercury and/or with the mercury compound adds to the alloy powder from 0.5 to 3% in weight of mercury, preferably from 0.5 to 2%, and that the total mercury content of the alloy powder enriched with mercury, i.e. of the end-product, is from 1 to 7% in weight, preferably from 1 to 4%. The powder obtained in such a way has a good resistance to corrosion in alkaline medium.

For subjecting the alloy powder to the surface amalgamation, the processes can be used that are already known for surface amalgamating mercury-free zinc powder, but the alloy powder can also be enriched with mercury by putting it in the presence of mercury vapour.

The present invention relates also to a zinc base powder containing mercury for alkaline batteries.

Such powder is known by the aforementioned patent application Nos. DE-A-2441356 and EP-A-0089608. In this known powder the particles have a substantially homogeneous composition. If present in sufficient quantities, mercury provides this powder with an excellent resistance to corrosion in the electrolyte of the alkaline battery.

The aim of the present invention is to provide a powder as defined before, which, although containing on the whole less mercury than the aforementioned known powder, has nevertheless an as good resistance to corrosion in alkaline medium as the known powder.

The powder according to the invention is characterized in that its particles consist of a core presenting a substantially homogeneous mercury distribution and of an outer layer having a higher mercury content than the core.

In the powder of the invention, the mercury content of the core of the particles ranges advantageously from 0.5 to 4% in weight, preferably from 0.5 to 2%, and the total mercury content ranges advantageously from 1 to 7% in weight, preferably from 1 to 4%.

EXAMPLE 1

This example deals with the preparation of a zinc base powder containing mercury for alkaline batteries by the process of the present invention.

A molten zinc bath is prepared containing 1% mercury and 0.05% lead. This molten bath is homogenized at 450° C. by stirring. The molten alloy is made to flow in a jet of compressed air, thereby producing an alloy powder, the particles of which have substantially the same homogeneous composition (Zn-1 Hg-0.05 Pb) as that of the homogeneous molten bath.

The alloy powder is sifted so as to separate thereof the fraction over 500 $\mu$m and, as far as possible, the fraction below 75 $\mu$m. In this way an alloy powder with a particle size of 75 to 500 $\mu$m is obtained.

The sifted alloy powder is mixed with 1% mercury at room temperature in a rotary drum. In this way, one obtains an alloy powder enriched with mercury having a total mercury content of 2%. The particles of this powder are composed of a core and an outer layer; the core presents a substantially homogeneous mercury distribution and the outer layer has a higher mercury content than the core.

The resistance of this powder to corrosion in alkalin medium is examined. To this end an electrolyte composed of 480 g KOH, 60 g ZnO and 460 ml distilled water is used. 25 g of the powder is put in 150 ml of this electrolyte, which is kept at 45° C., and the quantity of hydrogen that is released from the electrolyte for 45 hours is determined. The gassing rate is found to be 2.03 $\mu$l (microliter) per gramme of powder and per day.

EXAMPLE 2

This example deals also with the preparation of a zinc base powder containing mercury for alkaline batteries by the process of the present invention.

One operates in the same way as in example 1, but instead of mixing the sifted alloy powder with 1% of mercury, one mixes it with 2% of mercury. In this way, one obtains an alloy powder enriched with mercury having a total mercury content of 3%.

A gassing rate of 1.88 μl/g/day is found.

EXAMPLE 3

This example deals with the preparation of a zinc base powder containing mercury for alkaline batteries by the process according to the aforesaid patent application No. DE-A-2441356.

One operates in the same way as in example 2, but instead of preparing a molten bath with 1% mercury, a molten bath is prepared with 3% mercury and the sifted alloy powder is not mixed with mercury.

A gassing rate of 2.94 μl/g/day is found.

EXAMPLE 4

This example deals with the preparation of a zinc base powder containing mercury for alkaline batteries by the aforesaid prior art process that consists in subjecting a mercury-free zinc powder to a surface amalgamation.

One operates in the same way as in example 2, but now a molten bath is prepared that is free from mercury and, instead of mixing the sifted powder with 2% mercury, it is mixed with 3% mercury.

A gassing rate of 4.12 μl/g/day is found.

The comparison of the aforesaid examples shows that the mercury, when it was introduced in the zinc powder partly by the starting molten bath and partly by surface amalgamation, protects this powder much better against corrosion in alkaline medium then when it was introduced in the powder either completely by the starting molten bath or completely by surface amalgamation. Consequently, there is synergy between the mercury introduced in the powder through the starting molten bath and that one introduced in the powder through surface amalgamation.

It should be noted that the powders prepared in the hereabove examples contain 0.05% lead. The reason thereof is that lead also impedes the zinc corrosion. It impedes it, however, to a less extent than mercury. Other elements such as Au, Ag, Cd, In, Tl, Bi and Ga do so too. As a matter of fact, each element, the presence of which in zinc increases the overvoltage of hydrogen on the zinc, impedes the zinc corrosion and can be used in the process and the powder of the present invention. Hence, in addition to mercury, at least one of the beforesaid elements may be introduced in the powder. This can be done through the starting molten bath like in the aforementioned examples, but this can also be done during the surface amalgamation step, if liquid mercury is used containing the element or elements in question for carrying out this amalgamation. This can also be done in the two ways. Moreover this can be done by bringing the alloy powder, either before or after its enrichment with mercury, in contact with a solution containing at least one of the aforesaid elements as a compound, i.e. by cementation of the element or elements in question on the alloy powder, that has still to be enriched with mercury or that has already been enriched with mercury.

It should also be noted that in the aforesaid examples sifting was done so as to obtain a particle size of 75–500 μm for the simple reason that many battery manufacturers require such particle size. Other battery manufacturers, however, ask for other particle sizes such as e.g. 125–500 μm and 75–420 μm. Thus, the particle size mentioned in example 1 is by no means restrictive for the process and the powder of the invention.

In example 1 the alloy powder is sifted before its surface amalgamation. Instead of sifting before the surface amalgamation sifting can also be done after the surface amalgamation. Other techniques of particle sizing than sifting can also be used. This particle sizing is moreover superfluous, if the technique used for converting the molten starting bath into an alloy powder gives immediately the desired particle size. Hence, the sifting done in example 1 has nothing to do with the essence of the present invention.

Finally, it should be noted that it is preferable to prepare the alloy powder by pulverizing the molten bath in a gaseous current, since in this way a powder is obtained that is practically free from oxide and that presents a good grain size and a good morphology.

I claim:

1. A process for preparing a zinc base powder containing mercury for alkaline batteries, comprising the steps of
   (a) preparing an homogeneous molten bath composed of zinc, mercury and possibly other elements,
   (b) preparing from said molten bath an alloy powder with substantially homogeneous particles; and
   (c) making said alloy powder to react with metallic mercury and/or with a mercury compound, thereby producing an alloy powder enriched with mercury.

2. A process according to claim 1 wherein an alloy powder is prepared with a mercury content of 0.5 to 4% in weight.

3. A process according to claim 2 wherein an alloy powder is prepared with a mercury content of 0.5 to 2% in weight.

4. A process according to claim 1 wherein the alloy powder is made to react with metallic mercury and/or with a mercury compound so as to add thereto 0.5 to 3% in weight of mercury.

5. A process according to claim 4 wherein 0.5 to 2% in weight of mercury is added to the alloy powder.

6. A process according to claim 1 wherein one operates so as to produce an alloy powder enriched with mercury having a total mercury content of 1 to 7% in weight.

7. A process according to claim 6 wherein one operates so as to produce an alloy powder enriched with mercury having a total mercury content of 1 to 4% in weight.

8. A process according to claim 1 wherein the alloy powder is enriched with mercury by putting it in the presence of mercury vapour.

9. A process according to claim 1 wherein the alloy powder is made to react with liquid mercury containing at least one of the elements Au, Ag, Pb, Cd, In, Tl, Bi, Ga.

10. A process according to claim 1 wherein at least one of the elements Au, Ag, Pb, Cd, In, Tl, Bi and Ga is deposited by cementation on the alloy powder, either before or after its enrichment with mercury.

11. Powder obtained by the process according to claim 1.

12. Zinc base powder containing mercury for alkaline batteries, characterized in that its particles are composed of a core presenting a substantially homogeneous mercury distribution and of an outer layer having a higher mercury content than the core.

13. Powder according to claim 12 wherein the core of the particles has a mercury content of 0.5 to 4% in weight.

14. Powder according to claim 13 wherein the core has a mercury content of 0.5 to 2% in weight.

15. Powder according to claim 12 wherein the total mercury content ranges from 1 to 7% in weight.

16. Powder according to claim 15 wherein the total mercury content ranges from 1 to 4% in weight.

* * * * *